United States Patent [19]

Bauer

[11] Patent Number: 4,473,179

[45] Date of Patent: Sep. 25, 1984

[54] PIN FEED MECHANISM FOR TRANSPORTING CONTINUOUS STATIONERY

[75] Inventor: Karl A. Bauer, Augsburg, Fed. Rep. of Germany

[73] Assignee: NCR Corporation, Dayton, Ohio

[21] Appl. No.: 451,215

[22] PCT Filed: Sep. 8, 1982

[86] PCT No.: PCT/US82/01205

§ 371 Date: Dec. 6, 1982

§ 102(e) Date: Dec. 6, 1982

[87] PCT Pub. No.: WO84/01038

PCT Pub. Date: Mar. 15, 1984

[51] Int. Cl.[3] .......... G03B 1/30

[52] U.S. Cl. .......... 226/74; 226/87

[58] Field of Search .......... 226/74, 75, 76–81, 226/87, 52, 53; 227/43; 400/616.1, 616.2, 616.3; 271/34, 141, 198, 199; 206/820; 474/154, 203

[56] References Cited

U.S. PATENT DOCUMENTS

| | | | |
|---|---|---|---|
| 2,315,731 | 4/1943 | Paris | 226/87 X |
| 3,015,425 | 1/1962 | Wicklund | 226/74 |
| 3,368,727 | 2/1968 | Sutton | 226/74 |
| 4,214,691 | 7/1980 | Van Namen | 226/74 |

FOREIGN PATENT DOCUMENTS

| | | | |
|---|---|---|---|
| 470076 | 12/1950 | Canada | 226/87 |
| 649199 | 1/1951 | United Kingdom | 226/74 |

OTHER PUBLICATIONS

IBM Technical Disclosure Bulletin, vol. 20, No. 11A, Apr. 1978, Forms Feed Tractor, C. M. McCray pp. 4524.

*Primary Examiner*—Leonard D. Christian
*Attorney, Agent, or Firm*—Stephen F. Jewett; Robert L. Clark

[57] ABSTRACT

A pin feed mechanism (10) for transporting continuous stationery (11) having perforations (46) at both longitudinal edges thereof, in which transport pins (38) are arranged to engage with the perforations (46) and move the stationery (11) past a printing station. The pins (38) each have a tapered end to facilitate insertion of the pins (38) into the perforations (46). The tapered end of each pin (38) is shaped to have biconvex cross section, so that the curvature of its paper engaging surfaces has a constant radius of curvature along the length of the pin (38).

12 Claims, 11 Drawing Figures

PIN FEED MECHANISM FOR TRANSPORTING CONTINUOUS STATIONERY

BACKGROUND OF THE INVENTION

This invention relates to a pin feed mechanism for transporting continuous stationery. The invention has particular application to a mechanism for transporting continuous forms paper in high-speed line printers.

High-speed line printers usually function as peripheral devices of electronic data processing systems for printing out information generated by such systems. As information is generated at extremely high speeds, the printers must also be capable of operating at high-speed, and typical line printers used for this purpose are capable of printing about 120 lines per minute.

The stationery used for high-speed printers of this kind is continuous and is usually fed from a roll or from a stack of fan-folded stationery. Typically, continuous forms paper is provided with feed apertures or perforations at both longitudinal edges of the paper to enable feed pins or sprockets of a transport mechanism to engage the apertures and advance the paper past the printing station to perform a "line feed", a "page feed" or a continuous feed, as required by the system program.

The feeding mechanism for transporting the continuous forms paper may contain a pair of feeding devices each including a sprocketed endless tractor belt and a pressure shoe between which the paper passes during the feeding operation, the pins or sprockets of each belt being arranged to engage with a respective series of perforations along a longitudinal edge of the paper. Alternatively, the feeding mechanism may include a drum or cylindrical platen having a series of pins around its periphery at either end. The advantage of the tractor belt arrangement is that the distance between the two feeding devices may be adjusted to accept papers or different widths.

A problem encountered with pin feed mechanisms of the above described types is that the pins penetrating the perforations of the paper tend to cause deformation or even tearing of the paper at the points of contact with the pins at the high rate of paper advance usual with conventional line printers. This may be particularly troublesome with multi-copy forms sets where the perforations are not always properly aligned, and deformation of the bottom forms paper may cause bulging of the set and jamming of the feed mechanism leading to a disruption of the printing operation.

SUMMARY OF THE INVENTION

There is provided, according to the present invention, a pin feed mechanism for transporting continuous stationery having perforations provided at both longitudinal edges thereof, in which transport pins provided on driving means are arranged to engage with the perforations and move the stationery, wherein each pin is so shaped that the paper engaging surface thereof has a substantially constant radius of curvature along the length of the pin.

According to another aspect of the invention, there is provided a transport system for feeding stationery in a printer, including continuous stationery having perforations provided at both longitudinal edges thereof and a pin feed mechanism having transport pins arranged on a driving belt to engage with the perforations and move the stationery, wherein the paper engaging surface of each pin has a substantially constant radius of curvature along the length of the pin, which radius is substantially equal to the radius of curvature of the perforations of the stationery. This is accomplished in the preferred embodiments by providing a tapered end portion on each pin that has the cross-sectional shape of a biconvex lens.

It is, therefore, an object of the present invention to provide an improved feed mechanism for feeding stationery or paper in a line printer.

It is another object of the present invention to provide an improved feed mechanism of the type employing pins for engaging perforations along the longitudinal margins of stationery being fed or advanced by the feed mechanism.

It is a further object of the present invention to provide a pin feed mechanism in which the problems of deformation or tearing of the paper adjacent the perforations of single- or multiple-copy forms sets are alleviated.

These and other objects will become more apparent from the following description when taken in conjunction with the attached drawings.

DETAILED DESCRIPTION OF THE PREFERRED EMBODIMENTS

Figure 1:
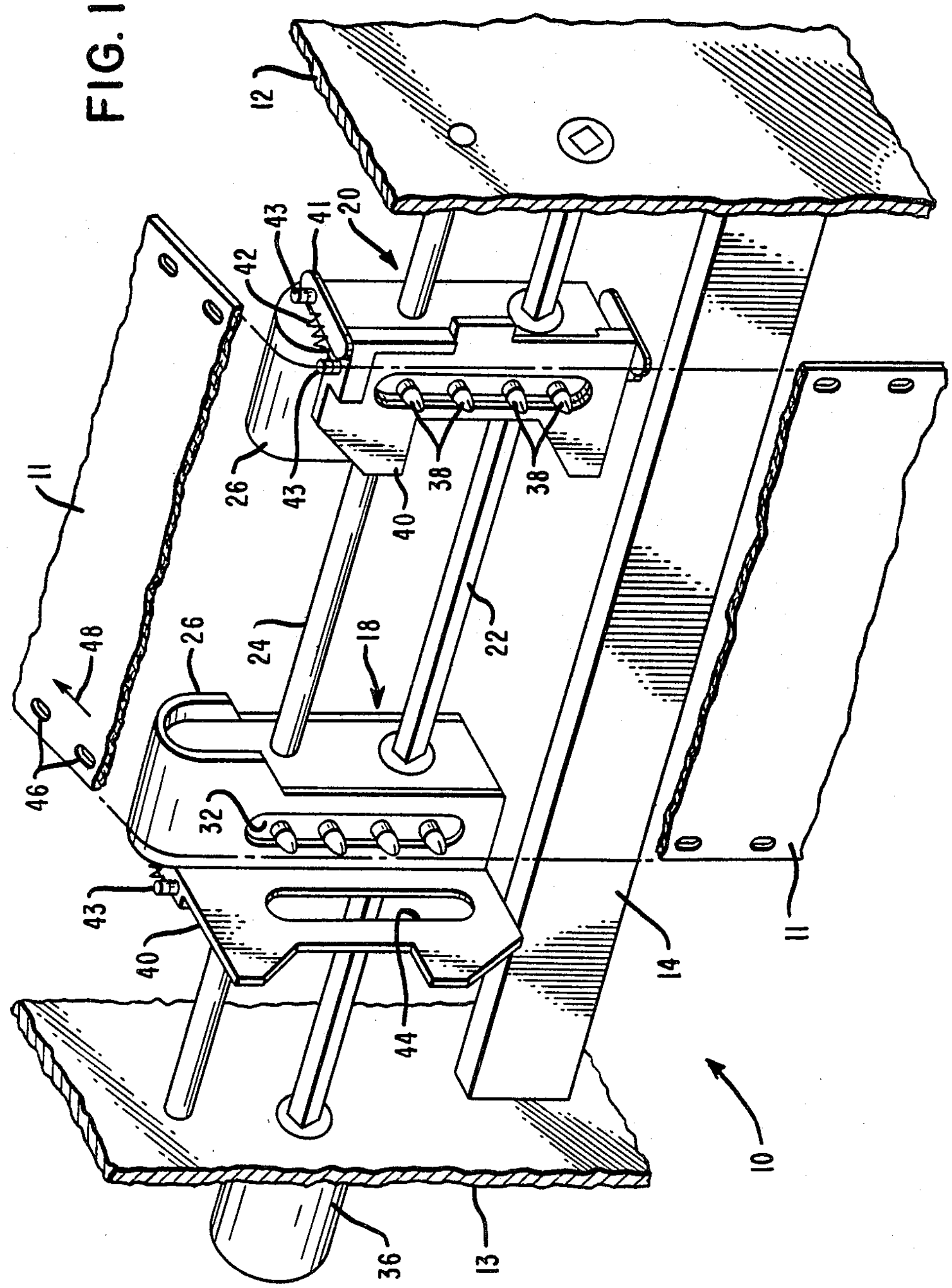
FIG. 1 is a perspective view of a part of a high-speed line printer that illustrates a pin feed mechanism according to the invention utilizing a pair of sprocketed endless tractor belts.
Figure 2:
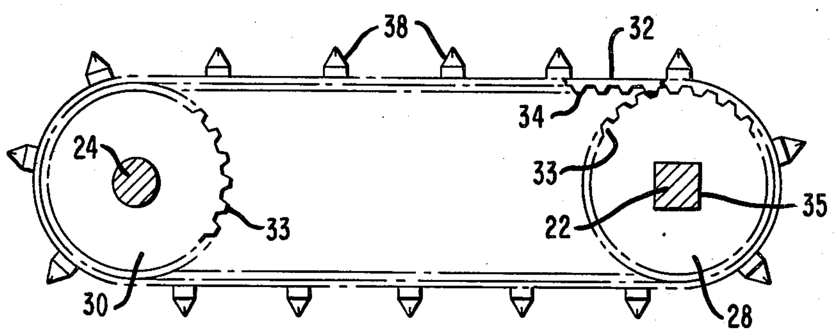
FIG. 2 is a partially sectioned side view of the tractor belt and gears within the housing of each feeding device of the pin feed mechanism of FIG. 1.

Referring now to FIGS. 1 and 2, there is shown a pin feed mechanism 10 for transporting continuous forms stationery or paper 11. The pin feed mechanism 10 is supported on a frame having side plates or walls 12 and 13. The side walls 12 and 13 are interconnected by a platen 14 supporting the paper 11 during the printing operation. A conventional printing device (not shown)

associated with the platen 14 provides a station for printing on the paper 11 along a line of printing.

The pin feed mechanism for the paper includes a pair of feeding devices 18 and 20 supported on a drive shaft 22 and a guide shaft 24. Each feeding device includes a housing 26 (omitted from FIG. 2) containing a pair of gears 28 and 30 (FIG. 2) mounted respectively on the shafts 22 and 24. As seen best in FIG. 2, an endless tractor belt 32 within housing 26 is trained and supported around the gears 28 and 30 so that the teeth 33 on each of the gears engage and mesh with teeth 34 provided on the inner side of the tractor belt 32.

In the illustrated mechanism 10, the tractor belt 32 is driven by the gear 28. The gear 28 has a square shaped opening 35 at its center (FIG. 2) that receives the drive shaft 22. The drive shaft 22 has a square-shaped cross section and is sized to snugly fit within opening 35 such that gear 28 rotates with drive shaft 22. Gear 28 and drive shaft 22 are rotatably driven by a motor 36 (FIG. 1). The gear 30 is freely rotatable on the guide shaft 24.

The tractor belt 32 is made of a suitable flexible plastic or other synthetic material. The outer side of the tractor belt 32 is provided with a series of feed pins 38 integrally formed on and projecting from the outside of the tractor belt. The general diameter and the spacing of the feed pins 38 are standard and correspond to the standard diameter and spacing of the perforations of conventional continuous stationery. The perforations of conventional continuous forms paper have a usual diameter of 4 millimeters$\pm$0.1 millimeter and the distance between two adjacent perforations is usually 12.7 millimeters.

A pressure shoe or clamp 40 is rotatably mounted, such as by a hinge 41, on the housing 26 of each of the feeding devices 18 and 20 so that each pressure clamp may swivel between a closed position at the housing 26 and an open position away from the housing 26. In FIG. 1, the pressure clamp 40 seen to the left is illustrated in the open position and the pressure clamp 40 seen to the right is illustrated in the closed position. A spring 42 is attached at its ends to spring pins 43 projecting from each pressure clamp 40 and its respective hinge 41. Each pressure clamp is thus biased toward its closed position at the housing 26. The pressure clamps 40 are each provided with an elongated opening 44 to accommodate the feed pins 38 of the associated feeding device 18 or 20.

As illustrated best in FIG. 1, to load the feed mechanism 10, the pressure clamps 40 are opened and continuous forms paper 11 is placed on the feeding devices 18 and 20 so that perforations 46 along the margins of paper 11 are located on the feed pins 38. The pressure clamps 40 are then closed to prevent the paper from riding up on the feed pins 38 during operation. When the motor 36 is operated to rotate the drive shaft 22 and gears 28, the teeth 33 on gears 28 engage with the internal teeth 34 of the respective tractor belt 32 advancing the belt so that the feed pins 38 provided thereon engage with the perforations 46 of the continuous forms paper 11, moving the paper in the direction of arrow 48. The structure and operation of the feed mechanism 10 as thus far described is conventional.

Referring now to FIGS. 3 through 6, there are shown two conventional feed pins 50 and 52. Feed pin 50 (FIGS. 3 and 4) and feed pin 52 (FIGS. 5 and 6) are each carried on a tractor belt 54 that may be similar to the tractor belt 32 of FIGS. 1 and 2. The pins 50 and 52 are each shown in the process of penetrating a perforation 56 of a single-copy forms paper 58 also shown in section. The pins 50 and 52 are, as conventional, rotationally symmetrical along their longitudinal axis and tapering at their ends, pin 50 being paraboloid in shape, and pin 52 having a cylindrical base with a tapering, conically shaped, top.

Figure 3:
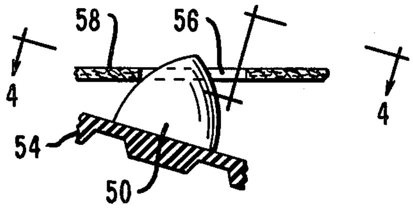
PRIOR ART FIG. 3
FIG. 3 is a partially sectioned side view illustrating one embodiment of a conventional feed pin in the process of penetrating a perforation of a continuous forms paper.
Figure 5:
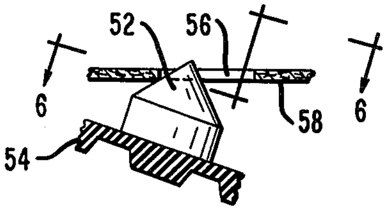
PRIOR ART FIG. 5
FIG. 5 is a partially sectioned side view illustrating another embodiment of a conventional feed pin in the process of penetrating a perforation of a continuous forms paper.
Figure 4:
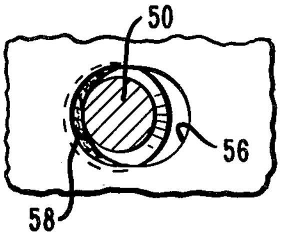
PRIOR ART FIG. 4
FIG. 4 is a cross section taken along the lines 4—4 of FIG. 3.
Figure 6:
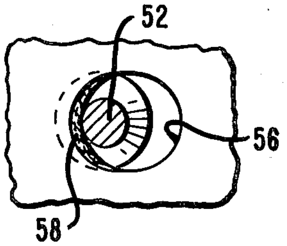
PRIOR ART FIG. 6
FIG. 6 is a cross section taken along the lines 6—6 of FIG. 5.

The diameter of the lowermost part of the pin 50 of FIGS. 3 and 4 and the diameter of the base of the pin 52 of FIGS. 5 and 6 are each substantially equal to the diameter of the perforation 56 of the continuous forms paper 58 used therewith. FIGS. 3 through 6 show pin penetration into the aperture 56 at the moment the pin starts to exert the force necessary for advancing the paper. From this moment onwards, and until there is full penetration or until the paper reaches the cylindrical base of the pin, the radius of pin curvature at the point of contact with the paper is always smaller than the radius of curvature of the perforation 56 and, as a result, an extremely small contact (in theory, a point-like contact) is established between pin and paper. This is most clearly shown in FIGS. 4 and 6.

The above illustrated disadvantage of rotationally symmetrical feed pins is avoided according to the present invention by adapting the lateral curvature of the previously described feed pins to the curvature of the feed apertures or perforations of the paper, so as to increase the extent of contact between the pins and the paper.

Figure 7A:
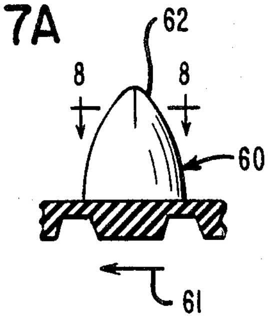
FIGS. 7A and 7B are side and front views, respectively, of one embodiment of a feed pin of the feed mechanism according to the present invention.
Figure 7B:
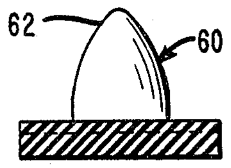
Figure 8:
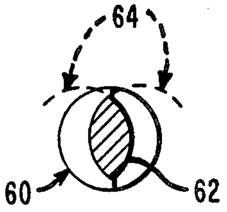
FIG. 8 is a cross section taken along the line 8—8 of FIG. 7A.

One embodiment of a pin 60 so shaped in accordance with the present invention is shown in FIGS. 7A, 7B and 8. FIG. 7A is a side view of the pin 60, that is to say, a view taken at right angles to the direction of pin and paper movement, which direction is indicated by arrow 61. FIG. 7B shows the paper engaging surface of the pin 60, this surface being viewed at right angles to the view shown in FIG. 7A. The pin 60 has a parabolic side elevation, the diameter of the pin towards its bottom being substantially equal to the diameter of the perforations of the paper in which it is arranged to engage. As illustrated in FIG. 8, the cross-section of the tapered upper end portion 62 of the pin 60 has the shape of a cross-section of a biconvex lens, the lateral curvature 64 of each lens half having a curvature which is substantially equal to the radius of the bottom portion. This curvature is substantially the same regardless of where the cross section is taken through the upper portion 62 of the pin 60. Thus, the pin 60 has a tapered end portion to facilitate penetration of the paper apertures, but the paper engaging surface of the pin 60 has a substantially constant radius of curvature along the length of the pin.

Figure 9A:
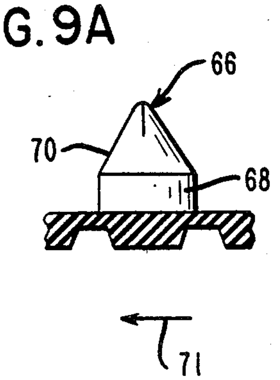
FIGS. 9A and 9B are side and front views, respectively, of another embodiment of a feed pin of the feed mechanism according to the present invention.
Figure 9B:
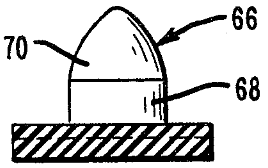

Referring to FIGS. 9A and 9B, there is shown a pin 66 illustrating an alternate form of the present invention, the pin 66 having a cylindrical base 68 and a tapered upper portion 70 which, like pin 60 of FIGS. 7A, 7B and 8, has a cross-section in the shape of a cross-section of a biconvex lens. FIG. 9A is a side view of the pin 66, taken at right angles to the direction of pin and paper movement (arrow 71), while FIG. 9B is a view of the paper engaging surface of the pin 66, this surface being viewed at right angles to the view shown in FIG. 9A. The difference between the pins 60 and 66 is that the upper portion 70 of the pin 66 has a cone shaped side elevation as viewed at right angles to the direction of pin movement (FIG. 9A). As in the case of pin 60, the paper engaging surface of the pin 66 has a substantially constant radius of curvature along the length of the pin, which is substantially equal to the diameter of the paper perforations in which the pin is arranged to engage. The feed pins 38 shown in FIGS. 1 and 2 have a shape identical with that of either the pin 60 or the pin 66.

Figure 10:
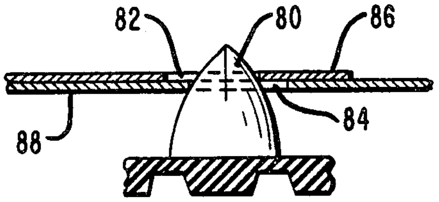
FIG. 10 is a side view of a pin of the feed mechanism according to the present invention, the pin penetrating misaligned perforations of a multi-copy forms set.
Figure 11:
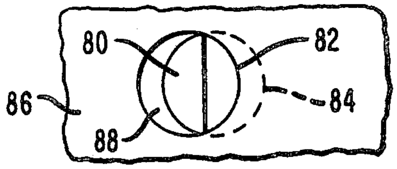
FIG. 11 is a top view of the pin and associated paper perforations shown in FIG. 10.

Adapting the lateral curvature of the pins 60 and 66 to the curvature of the perforations of the continuous forms paper results in a significant reduction of deformation and tear of the paper as the pins start to penetrate into the perforations because the pins no longer contact the paper at a point only, but rather along a significant portion of the circumference of the perforations. This extended contact is particularly beneficial with multi-copy or multi-sheet forms sets as it eases the penetration of the pins into the perforations, even when the individual forms are not perfectly aligned. In such cases, the pins are able to align the misaligned forms of the set to a certain degree. This may be seen from FIGS. 10 and 11, which show a pin 80, having a shape similar to that of pin 60 of FIG. 6A, penetrating perforations 82 and 84 of misaligned sheets 86 and 88, respectively.

Although the presently preferred embodiments of the present invention have been described, it should be understood that within the purview of the present invention various changes may be made within the scope of the appended claims.

I claim:

1. In a pin feed mechanism for transporting stationery having circular perforations, said mechanism including transport pins arranged to engage with the perforations and move said stationery, the improvement wherein each of said pins has a tapered upper end portion to facilitate insertion of the pins into said perforations, with said upper end portion there being on a paper engaging surface each of said pins having a substantially constant radius of curvature along the entire axial length of the pin, which radius is substantially equal to the radius of curvature of said perforations.

2. The improvement according to claim 1, wherein the cross-section of said upper end portion of each of said pins has the shape of a cross-section of a biconvex lens.

3. In a transport system for feeding continuous stationery having perforations provided at both longitudinal edges thereof and having a pin feed mechanism having tapered transport pins arranged to engage with said perforations and move said stationery, the improvement comprising paper-engaging surfaces on each pin having a substantially constant radius of curvature along the entire axial length of the pin, which radius is substantially equal to the radius of curvature of said perforations in said stationery.

4. The improvement according to claim 3, wherein the cross section of each said pin taken along at least an end portion thereof has the shape of a cross section of a biconvex lens.

5. The improvement according to claim 4, wherein said perforations in said stationery are circular and wherein each said pin includes a base portion having a circular cross-section of a diameter substantially equal to the diameter of the circular perforations in said stationery.

6. The improvement according to claim 3, wherein the radius of curvature of each of said pins is about 4 millimeters.

7. A feed mechanism for transporting paper having perforations, comprising:

transport pins for insertion into said perforations and engagement therewith;

pin driving means for driving said pins in a direction to transport said paper; and an axial tapered end portion on each of said pins to facilitate insertion of said pins into said perforations, said tapered end portion having a biconvex cross-sectional shape so that there is substantial contact between said pins and said paper during insertion of said pins into said perforations, the radii of curvature of said shape being substantially equal to the radius of curvature of the paper contacting surface formed of said perforations.

8. The feed mechanism of claim 7, wherein said pin driving means comprises an endless belt, with said transport pins spaced along and projecting from said belt.

9. The improvement according to claim 1 wherein each of said pins has a parabolic side elevation, as viewed at right angles to the direction of pin movement; and wherein each of said pins has a base portion having a circular cross-section of a diameter substantially equal to the diameter of said circular perforations.

10. The improvement according to claim 9 wherein the cross-section of said upper end portion of each of said pins has the shape of a cross-section of a biconvex lens.

11. The improvement according to claim 1 wherein said upper end portion of each of said pins has a cone-shaped side elevation, as viewed at right angles to the direction of pin movement; and wherein each of said pins has a cylindrical base having a diameter substantially equal to the diameter of said circular perforations.

12. The improvement according to claim 11 wherein the cross-section of said upper end portion of each of said pins has the shape of a cross-section of a biconvex lens.

* * * * *